(12) United States Patent
Pierce (10) Patent No.: US 10,631,634 B1
(45) Date of Patent: Apr. 28, 2020

(54) MODULAR CONTAINER HOLDER WITH COLLAPSIBLE BASKET

(71) Applicant: Carrick J. Pierce, New York, NY (US)

(72) Inventor: Carrick J. Pierce, New York, NY (US)

( * ) Notice: Subject to any disclaimer, the term of this patent is extended or adjusted under 35 U.S.C. 154(b) by 0 days.

(21) Appl. No.: 16/421,869

(22) Filed: May 24, 2019

(51) Int. Cl.
*A47B 43/00* (2006.01)
*A47B 73/00* (2006.01)
*A47B 87/00* (2006.01)
*A47G 29/08* (2006.01)
*A47B 81/00* (2006.01)
*A47G 23/02* (2006.01)
*A47F 7/28* (2006.01)

(52) U.S. Cl.
CPC ............ *A47B 43/00* (2013.01); *A47B 73/008* (2013.01); *A47B 81/00* (2013.01); *A47B 87/007* (2013.01); *A47F 7/28* (2013.01); *A47G 23/0216* (2013.01); *A47G 29/08* (2013.01)

(58) Field of Classification Search
CPC ....... A47B 73/008; A47B 73/00; A47B 81/00; A47B 87/007; A47F 7/28; A47G 29/08; A47G 23/0216; A47G 23/0225; A47G 23/0233
See application file for complete search history.

(56) References Cited

U.S. PATENT DOCUMENTS

| | | | |
|---|---|---|---|
| 1,378,902 A | 5/1921 | Roehl | |
| 2,649,270 A * | 8/1953 | Franks | B60N 3/102 248/311.2 |
| 4,064,992 A | 12/1977 | Ralston et al. | |
| 4,378,889 A | 4/1983 | Lebowitz | |
| 4,434,961 A * | 3/1984 | Hoye | B60N 3/10 108/44 |
| 5,342,009 A * | 8/1994 | Lehner | A47G 23/0225 248/284.1 |
| D402,512 S | 12/1998 | Lee et al. | |
| 6,045,017 A * | 4/2000 | Connell | A45F 5/02 224/148.4 |
| 6,047,937 A * | 4/2000 | Huang | B60N 3/102 248/311.2 |
| 6,427,960 B1 * | 8/2002 | Gehring | B60N 3/102 248/311.2 |
| 6,435,633 B2 * | 8/2002 | Hoshi | A47B 73/00 312/242 |

(Continued)

*Primary Examiner* — Stanton L Krycinski
(74) *Attorney, Agent, or Firm* — Goldstein Law Offices, P.C.

(57) ABSTRACT

A modular container holder comprising a backing panel and a collapsible basket portion, the backing panel has a magnetic mounting means adapted to detachably secure the modular container holder to a vertical mounting surface, the basket portion projects forwardly from the backing panel and is adapted to receive and retain a container. The basket portion has a plurality of movable basket elements which allow the basket portion to be alternatively placed in an assembled state to receive the container, and a collapsed state which reduces the amount of space occupied by the modular container holder. A contiguous modular arrangement of multiple modular containers positioned in column or row configurations allows multiple containers to be stored, while the basket portion is tilted forwardly to prevent the obstruction of basket openings when the modular container holders are vertically stacked in the column configuration.

10 Claims, 10 Drawing Sheets

(56) References Cited

U.S. PATENT DOCUMENTS

| | | | |
|---|---|---|---|
| 6,808,149 B1 | 10/2004 | Sendowski et al. | |
| D509,691 S | 9/2005 | Doran | |
| 7,300,031 B2 * | 11/2007 | Bertsch | A47G 23/0225 |
| | | | 224/281 |
| 7,562,853 B2 | 7/2009 | Mazzola | |
| 8,245,894 B2 * | 8/2012 | Buehler | B62B 3/1472 |
| | | | 224/411 |
| 8,439,209 B2 | 5/2013 | Strollo | |
| 8,851,436 B2 * | 10/2014 | Adachi | A47G 23/0216 |
| | | | 248/311.2 |
| 9,241,554 B1 * | 1/2016 | Tong | A45C 13/00 |
| 9,282,842 B1 | 3/2016 | Brooks | |
| 9,295,320 B1 * | 3/2016 | McManus | A45F 5/021 |
| 9,516,941 B1 * | 12/2016 | Moulton | A47G 23/0225 |
| 10,272,812 B2 * | 4/2019 | Ghannam | A47G 23/0216 |
| 2014/0360955 A1 | 12/2014 | Presenty | |
| 2017/0325559 A1 * | 11/2017 | Johnson | A47G 23/0225 |

\* cited by examiner

MODULAR CONTAINER HOLDER WITH COLLAPSIBLE BASKET

TECHNICAL FIELD

The present disclosure relates generally to a repositionable holder for storing containers. More particularly, the present disclosure relates to a collapsible modular container holder which is detachably secured to a mounting surface.

BACKGROUND

Racks and shelves are often used to store and organize containers. However, conventional racks and shelves are fixed in size and shape and cannot be reconfigured or expanded to suit specific storage and organizational needs, causing inefficient use of space. For example, containers holding different spices are stored on a spice rack. The spice rack cannot be reconfigured to increase or decrease the number of spaces for containers, in response to changing storage needs.

As a result, the prior art contains many examples of reconfigurable storage and mounting apparatuses, such as movable shelves, and repositionable holders. However, these devices are often tailored towards holding containers with a specific shape and are unsuitable for storing collections of containers with diverse shapes and sizes. The devices within the prior art are also difficult to stack vertically, as holders in the stack are obstructed by the holders positioned above. Furthermore, existing repositionable holders lack any way of ensuring consistent alignment between multiple holders employed simultaneously, resulting in a haphazard or disorganized arrangement.

Lastly, conventional shelves and racks occupy significant amounts of space, making them difficult to store when not in use, and further occupy increased warehouse and retail space.

Therefore, a need exists for a modular container holder capable of being detachably secured to a mounting surface, which is further capable of holding containers of any shape and size, does not obstruct the insertion or removal of containers when multiple modular container holders are vertically stacked upon the mounting surface, and is collapsible to significantly reduce storage and packaging requirements.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a holder capable of receiving and storing a container, which is further capable of being detachably secured to a ferrous vertical mounting surface. Accordingly, the present disclosure provides a modular container holder comprising a backing panel and a basket portion, the basket portion is adapted to receive and store the container, while the backing panel has a magnet mounting means adapted to detachably secure a modular container holder upon the vertical mounting surface.

It is another aspect of an example embodiment in the present disclosure to provide a holder which is collapsible to reduce storage and packaging requirements. Accordingly, the present disclosure provides a modular container holder whereby the basket holder is placed in a collapsed state when not in use.

It is still another aspect of an example embodiment in the present disclosure to provide a holder capable of being combined with other holders to store a plurality of containers. Accordingly, the present disclosure provides a modular container holder whereby the backing panel has top and lower edges and sides extending therebetween, allowing multiple modular container holders to be contiguously aligned in a column configuration or a row configuration.

It is yet another aspect of an example embodiment in the present disclosure to provide a holder which allows containers to be inserted or removed without obstruction when the modular container holders are positioned in the column configuration. Accordingly, the present disclosure provides a modular container holder whereby the basket portion tilts forwardly away from the backing panel, preventing the obstruction of the basket portion of the modular container holder positioned below another modular container holder in the column configuration.

It is a further aspect of an example embodiment in the present disclosure to provide a holder which is prevented from sliding downwardly upon the vertical mounting surface. Accordingly, the present disclosure provides a modular container holder further comprising a friction element positioned upon the rear face of the backing panel, which is adapted to frictionally engage the vertical mounting surface to prevent the modular container holder from sliding downwardly.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 6 is a diagrammatic side view of the modular container holder, depicting the basket portion in a locked position, and showing a basket upper frame, a basket front, and a basket base panel which interlock to form the basket portion, in accordance with an embodiment in the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
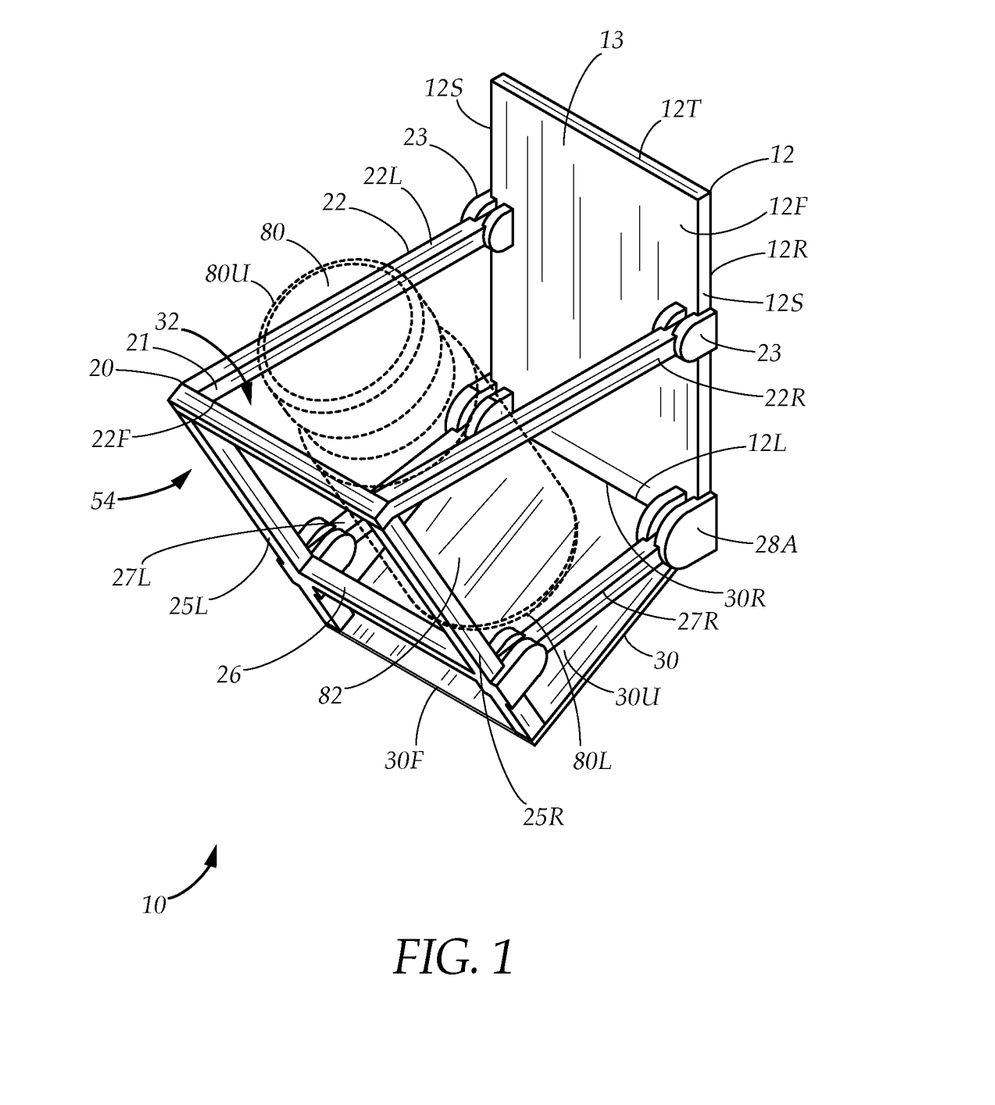
FIG. 1 is a diagrammatical depiction of a modular container holder adapted to retain and support a container, the container holder having a backing panel with a collapsible basket portion projecting forwardly therefrom, in accordance with an embodiment in the present disclosure.
Figure 2:
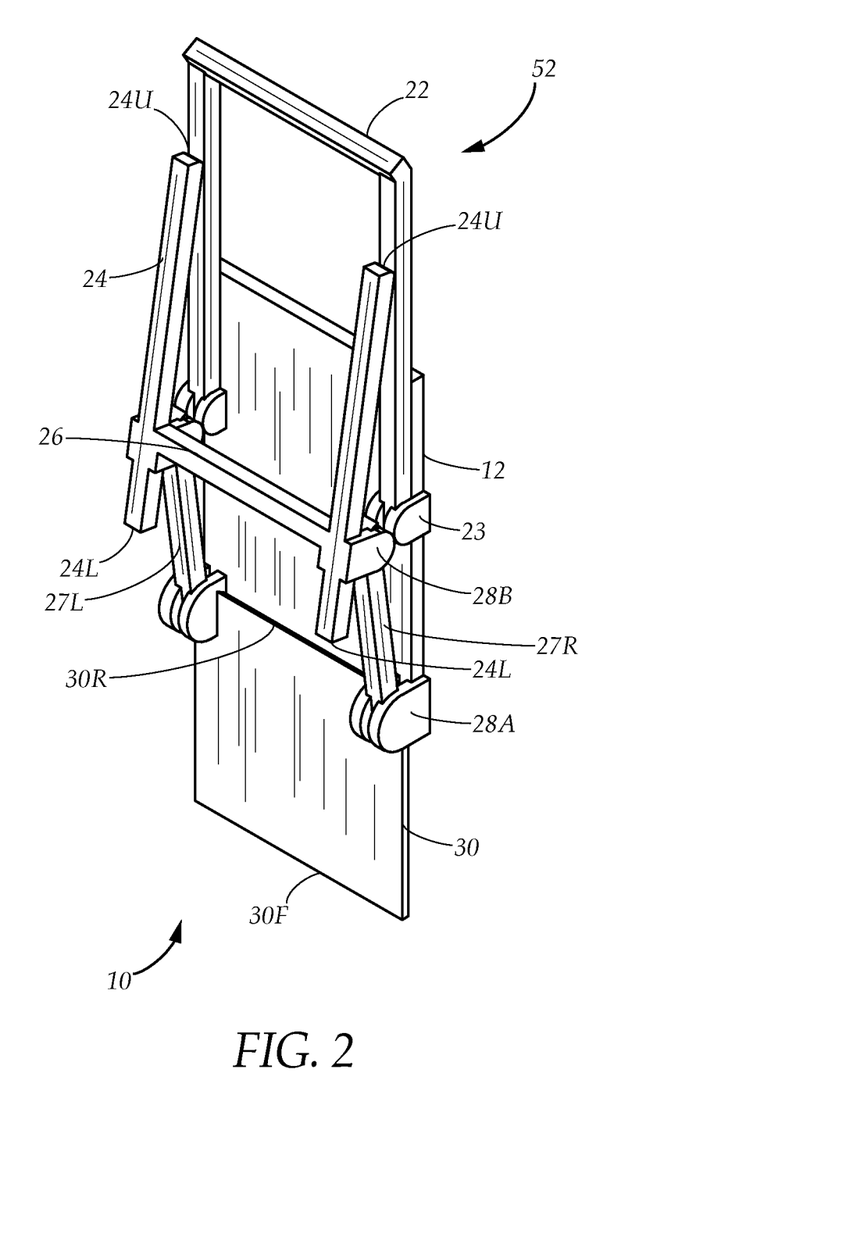
FIG. 2 is a diagrammatical depiction of the modular container holder, showing the basket portion in a collapsed state, in accordance with an embodiment in the present disclosure.
Figure 3:
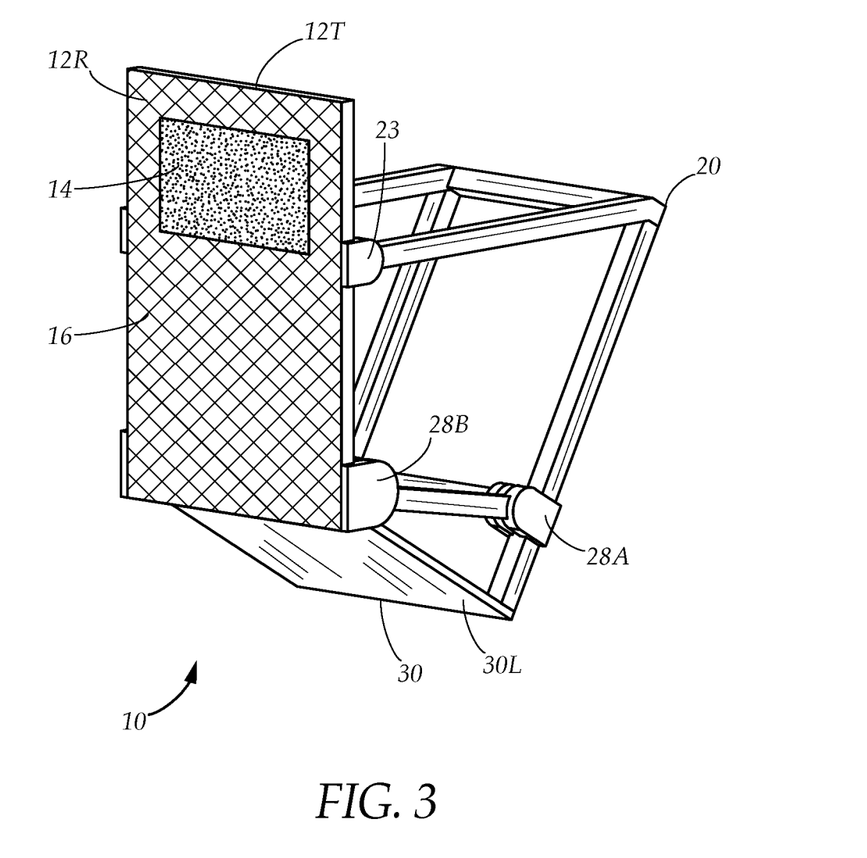
FIG. 3 is a diagrammatical depiction of the modular container holder viewed from the rear, showing the backing panel rear face with a magnet and a friction element, in accordance with an embodiment in the present disclosure.
Figure 4:
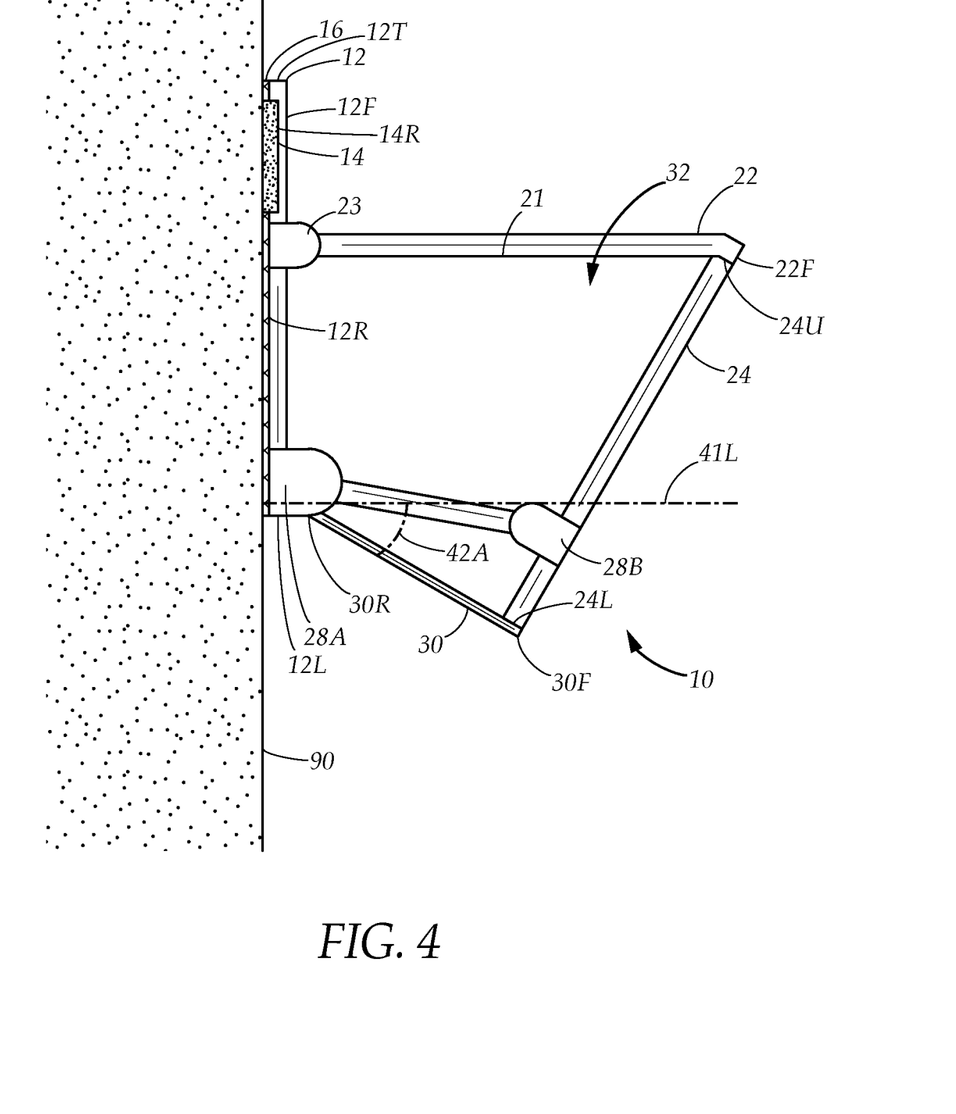
FIG. 4 is a diagrammatical cross section view of the modular container holder viewed from the side, showing the rear panel back face in magnetic contact with a vertical mounting surface, with the frictional layer preventing the modular container holder from sliding downwards, in accordance with an embodiment in the present disclosure.
Figure 5:
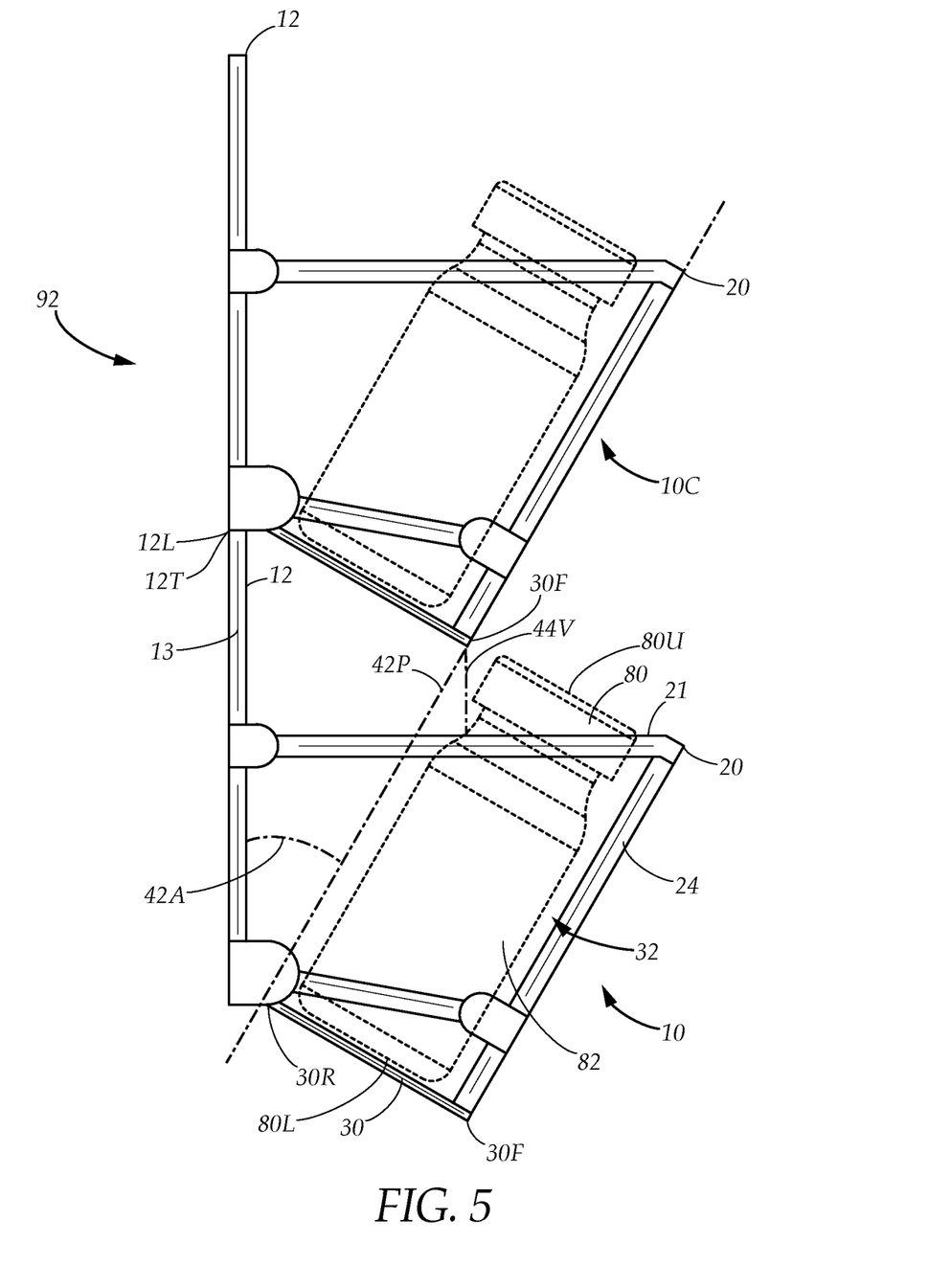
FIG. 5 is a diagrammatical side view of two modular container holders positioned in a column configuration, whereby the basket portion of each of the modular container holders is positioned at a basket tilt angle which allows access to the basket retaining space to remain unobstructed by the basket portion of the modular container holder positioned above, in accordance with an embodiment in the present disclosure.

FIG. 1 illustrates a modular container holder 10 comprising a backing panel 12 and a basket portion 20. The backing panel 12 has a front face 12F, a rear face 12R disposed opposite thereof, a top edge 12T, and a lower edge 12L. The basket portion 20 projects from the front face 12F and tilts forwardly. The backing panel 12 may further have a pair of sides 12S which extend between the top and lower edges 12T, 12L. The basket portion 20 has an upwardly opening basket opening 21 which reveals a basket retaining space 32, which is adapted to receive and retain a container 80. The container 80 may be a bottle, jar, can, vessel, or other storage apparatus adapted to store a variety of contents. The container 80 may have a container upper portion 80U, a container lower portion 80L, and a container body 82 which extend therebetween. Referring to FIG. 1 and FIG. 2, the basket portion 20 is collapsible, thus reducing the amount of space occupied by the modular container holder 10 when the basket portion 20 is not in use. Turning briefly to FIGS. 3-5, the backing panel 12 is adapted to be detachably secured to a vertical mounting surface 90, allowing the modular container holder 10 to be attached or repositioned to any point upon the vertical mounting surface 90. Furthermore, multiple modular container holders 10 may be combined to form a contiguous modular arrangement 92 upon the vertical mounting surface 90. For example, multiple modular container holders 10 may be employed to hold containers 80 of spices or condiments upon a refrigerator door, thus creating a modular spice rack.

Turning now to FIG. 3 while also referring to FIG. 4, the rear face 12R of the backing panel 12 is adapted to be attached to the vertical mounting surface 90. In a preferred embodiment, the rear face 12R of the backing panel 12 has a mounting means comprising a magnet 14, and the vertical mounting surface 90 may be a refrigerator door, metal cabinet, or other surface formed using ferrous materials, to which the magnet 14 may detachably adhere. The rear face 12R of the backing panel 12 may also have a magnet retention slot 14R which is adapted to retain the magnet 14 and allow the magnet to 14 remain flush with the rear face 12R. The magnet retention slot 14R and/or the magnet 14 may be positioned proximate to the top edge 12T of the backing panel 12. The rear face 12R of the backing panel may further have a friction element 16 which is adapted to contact and frictionally engage the vertical mounting surface 90 to prevent the modular container holder 10 from being pulled downward by gravity. The friction element 16 may be implemented using rubber, friction tape, or any other similar material which is thin and has high frictional properties. In one embodiment, the friction element 16 may be positioned between the magnet 14 and the lower edge 12L of the backing panel 12. In another embodiment, the friction element 16 may cover the entirety of the rear face 12R with the exception of the magnet 14, such that the friction element 16 surrounds the magnet 14. The magnet 14 may have a thickness which allows the magnet 14 to remain flush with the friction element 16. Note that in alternate embodiments, the mounting means may be a reusable adhesive or other suitable means which allows the modular container holder 10 be detachably secured to the vertical mounting surface 90. In certain embodiments, the mounting means may instead be used to permanently attach the modular container holder to the vertical mounting surface 90.

Returning now to FIGS. 1 and 2 while also referring to FIG. 4, the basket portion 20 has a plurality of movable basket elements. In a preferred embodiment, the movable basket elements comprise a basket front 24, a basket upper frame 22, and a basket base panel 30. The movable basket elements are each adapted to pivot in relation to the backing panel 12 in order to allow the basket portion 20 to alternate between an assembled state 54 where the basket portion 20 is ready to receive and retain the container 80, and a collapsed state 52 which minimizes the amount of space occupied by the modular container holder 10.

In one embodiment, the basket front 24 has a basket front upper portion 24U, a basket front lower portion 24L, and a basket front hinge 28B positioned between the basket front upper and lower portions 24U, 24L. The backing panel 12 has a lower backing panel hinge 28A, and the basket portion 20 further has a pair of pivot arms 27 which extend from the lower backing panel hinge 28A to the basket front hinge 28B. The basket front 24 is adapted to pivot about the basket front hinge 28B, allowing the basket front upper portion 24U to be brought towards or away from the pivot arms 27. The lower backing panel hinge 28A allows the pivot arms 27 to pivot upwardly or downwardly in order to raise the basket front 24 towards the top edge 12T of the backing panel 12, or lower the basket front 24 towards the lower edge 12L of the backing panel 12. The pivot arms 27 may comprise a left pivot arm 27L and a right pivot arm 27R, which each join with the backing panel 12 at a point proximate to one of the backing panel sides 12S, such that the container 80 is positioned between the pivot arms 27 when placed within the basket retaining space 32.

In a preferred embodiment, the basket retaining space 32 is formed between the basket front 24, the basket base panel 30, and the two pivot arms 27. The basket base panel 30 is adapted to support the container lower portion 80L when the container 80 is placed within the basket retaining space 32. The basket base panel 30 is positioned proximate to the lower edge 12L of the backing panel 12, and has a base panel rear edge 30R positioned towards the backing panel 12 and base panel front edge 30F which projects away from the backing panel 12. As one of the movable basket elements, the basket base panel 30 is adapted to be selectively raised or lowered. The base panel rear edge 30R may be pivotally connected to the lower backing panel hinge 23, or may be connected to a separate hinge in an alternate embodiment. For example, the backing panel 12 may have multiple lower backing panel hinges 28A. When the basket base panel 30 is raised or lowered, the basket base panel 30 pivots about the lower backing hinge 28A, moving the base panel front edge 30F either upwardly towards, or downwardly away from, the top edge 12T of the backing panel 12.

The basket upper frame 22 serves to reinforce the basket portion 20, and may also be used to define the basket opening 21. The backing panel 12 further has an upper backing panel hinge 23 positioned between the top edge 12T and the lower backing panel hinge 28A, to which the basket upper frame 22 is connected, allowing the basket upper frame 22 to be pivotally raised or lowered. In one embodiment, the basket upper frame 22 has an upper frame left member 22L and an upper frame right member 22R which are pivotally connected to the upper backing panel hinge 23 and project away from the front face 12F of the backing panel 12, and an upper frame front member 22F which extends laterally between the upper frame left and right members 22L, 22R.

Referring to FIGS. 1, 4, and 5, when the basket portion 20 is in the assembled state 54, the pivot arms 27 are positioned to extend forwardly away from the backing panel 12, while the basket front 24 is raised so that the basket front upper portion 24U points upwardly. The base panel front edge 30F is raised to contact the front panel lower portion 24U, and the basket upper frame 22 is lowered until the upper frame front member 22F contacts the basket front upper portion 24U. The basket opening 21 is formed between the upper frame front, left, and right members 22F, 22L, 22R, allowing the container lower portion 80L to be downwardly inserted therethrough. Once within the basket retaining space 32, the container 80 is positioned between the pivot arms 27, with the container lower portion 80L being supported by the basket base panel 30. As the basket portion 20 tilts forwardly away from the backing panel 12, the container body may rest against the basket front 24. For containers 80 which are sufficiently tall, the upper frame left and right members 22L, 22R may also assist in maintaining the container 80 within the basket retaining space 32. The basket portion 20 is capable of retaining containers 80 of any shape, as long as the container lower portion 80L rests upon the basket base panel 30 and the container 80 is prevented from falling out of the basket retaining space 32 by the basket front 24, the basket upper frame 22, and/or the pivot arms 27.

Once the basket portion 20 is in the assembled state 54, the movable basket elements may detachably interlock with each other through various means, including, but not limited to, magnets, fasteners, snap fit joints, as well as other locking means which will be apparent to one of ordinary skill in the art in the field of the invention. The locking means maintain the integrity of the basket portion 20 in the assembled state 54, but allow the movable basket elements to be detached from each other so that the basket portion 20 remains collapsible.

Referring to FIGS. 1 and 4, the basket portion 20 is tilted forwardly at a basket tilt angle 42A. The base panel rear edge 30R extends perpendicularly across the front face 12F of the backing panel 12, and the basket base panel is angled downwardly to match the basket tilt angle 42A. In a preferred embodiment, the basket tilt angle 42A is approximately thirty degrees in relation to a horizontal line 41L drawn perpendicularly in relation to the backing panel 12. The basket base panel 30 therefore projects away from the backing panel 12 at an angle of approximately 30 degrees in relation to the horizontal line 41L, when the horizontal line 41L extends through the base panel rear edge. The basket front 24 is oriented perpendicularly in relation to the basket base panel 30. When the container 80 is retained within the basket retaining space 32, the container lower portion 80L rests upon the basket base panel 30 while the container body 82 is supported by the basket front 24, thus ensuring that the container 80 is held at an angle of approximately thirty degrees in relation to the backing panel 12, equal to the basket tilt angle 30.

Referring to FIG. 5 while also referring to FIGS. 1, 3 and 4, the modular container holder 10 may be combined with a substantially identical second modular container holder 10C to form a contiguous modular arrangement 92 upon the vertical mounting surface 90. For example, the modular container holder may be vertically stacked to form a column configuration, where the modular container holder 10 is positioned below the second modular container holder 100, with the top edge 12T of the modular container holder 10 in contact with the lower edge 12L of the second modular container holder 100. Alternatively, the modular container holder 10 may be placed alongside the second modular container holder 10C to create a horizontal configuration, whereby one of the sides 12S of the modular container holder 10 is in contact with one of the sides 12S of the second modular container holder 10C. The contiguous modular arrangement 92 of modular container holders 10 and 10C allows for efficient and flexible use of the vertical mounting surface 90 to store multiple containers 80. The top and lower edges 12T, 12L and sides 12S of the backing panel 12 ensure that the modular container holders 10 within the contiguous modular arrangement 92 are consistently aligned.

Furthermore, the basket tilt angle 42A ensures that the basket portion 20 of the second modular container holder 10C does not obstruct the insertion or removal of the container 80 through the basket opening 21 of the modular container holder 10 positioned therebelow in the column configuration. The base panel front edge 30F of the second modular container holder 10C is therefore separated from the basket opening 21 of the modular container holder 10 by a vertical distance 44V sufficient to prevent the obstruction of the basket opening 21.

The backing panel 12 may further have a backing panel upper portion 13 which extends between the top edge 12T and the basket portion 20, and has an upper portion height. In certain embodiments, the backing panel upper portion 13 may extend from the upper backing panel hinge 23 to the top edge 12T of the backing panel 12. The backing panel upper portion 13 has an upper portion height, which ensures that the distance between the basket portions 20 of the second modular container holder 10C and the modular container holder 10 do not decrease below the vertical distance 44V.

In certain embodiments, the basket front 24 is perpendicular to the basket base panel 30. When in the column configuration, the basket front 24 of the second modular container holder 100 approaches and may be coplanar with an alignment plane 42P which projects upwardly from the base panel rear edge 30R and is perpendicular to the basket base panel 30. However, the basket front 24 of the second modular container 10C is prevented from extending downwardly past the alignment plane 42P by the backing panel upper portion 13 of the modular container holder 10 positioned therebelow. In embodiments where the basket front 24 is not necessarily perpendicular to the basket base panel 30, the backing panel upper portion 13 prevents the base panel front edge 30F from extending downwardly past the alignment plane 42P.

Figure 7:
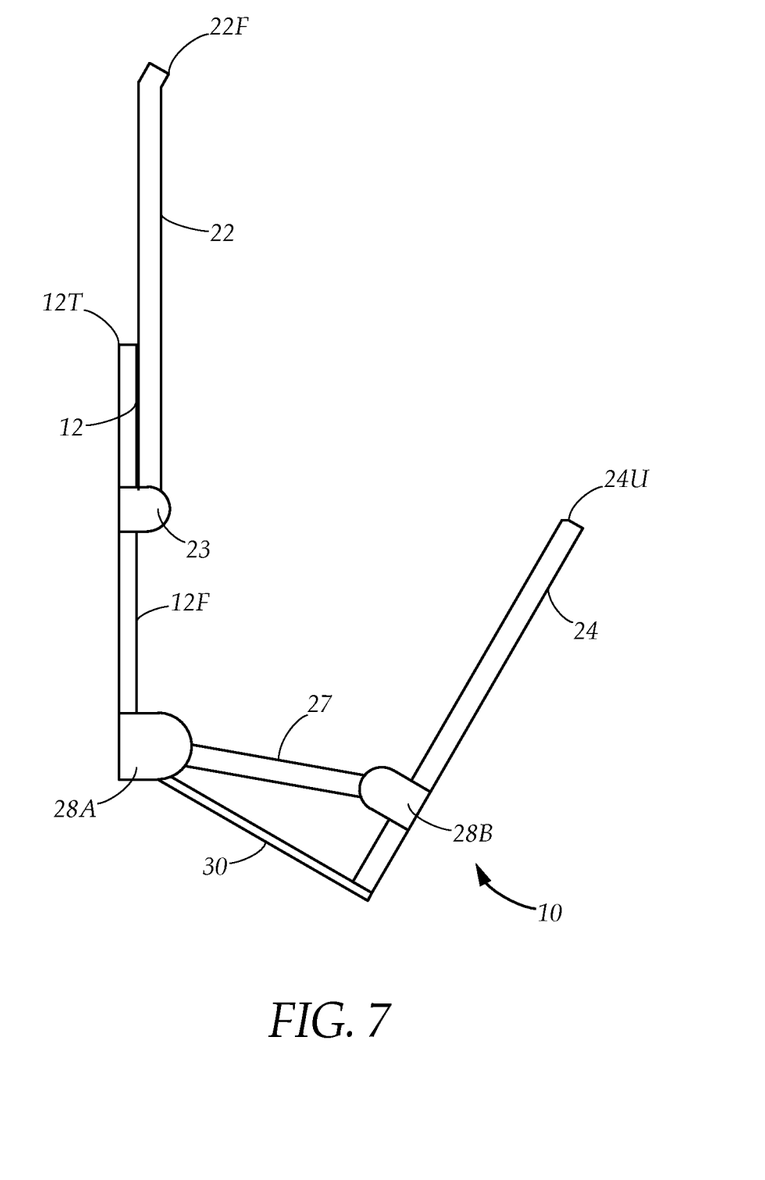
FIG. 7 is a diagrammatic side view of the modular container holder, showing the basket upper frame pivoting upwardly away from the basket front via an upper backing panel hinge, in accordance with an embodiment in the present disclosure.
Figure 8:
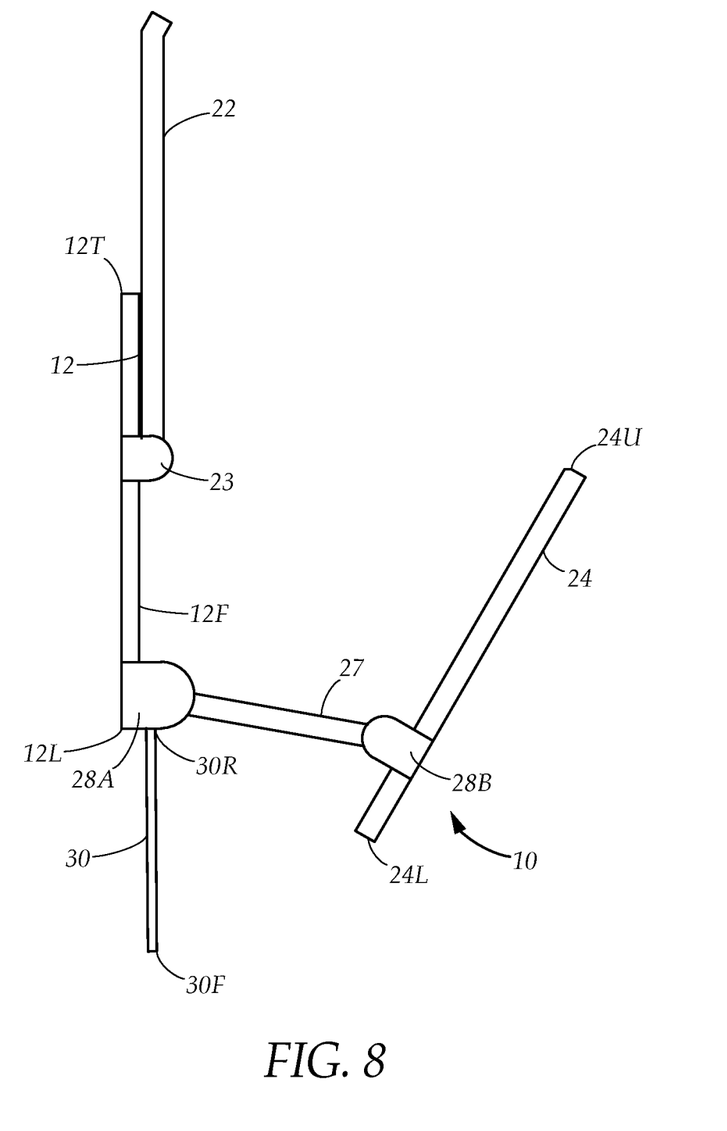
FIG. 8 is a diagrammatic side view of the modular container holder, showing the basket base panel pivoting downwardly away from the basket front via a lower backing panel hinge, in accordance with an embodiment in the present disclosure.
Figure 9:
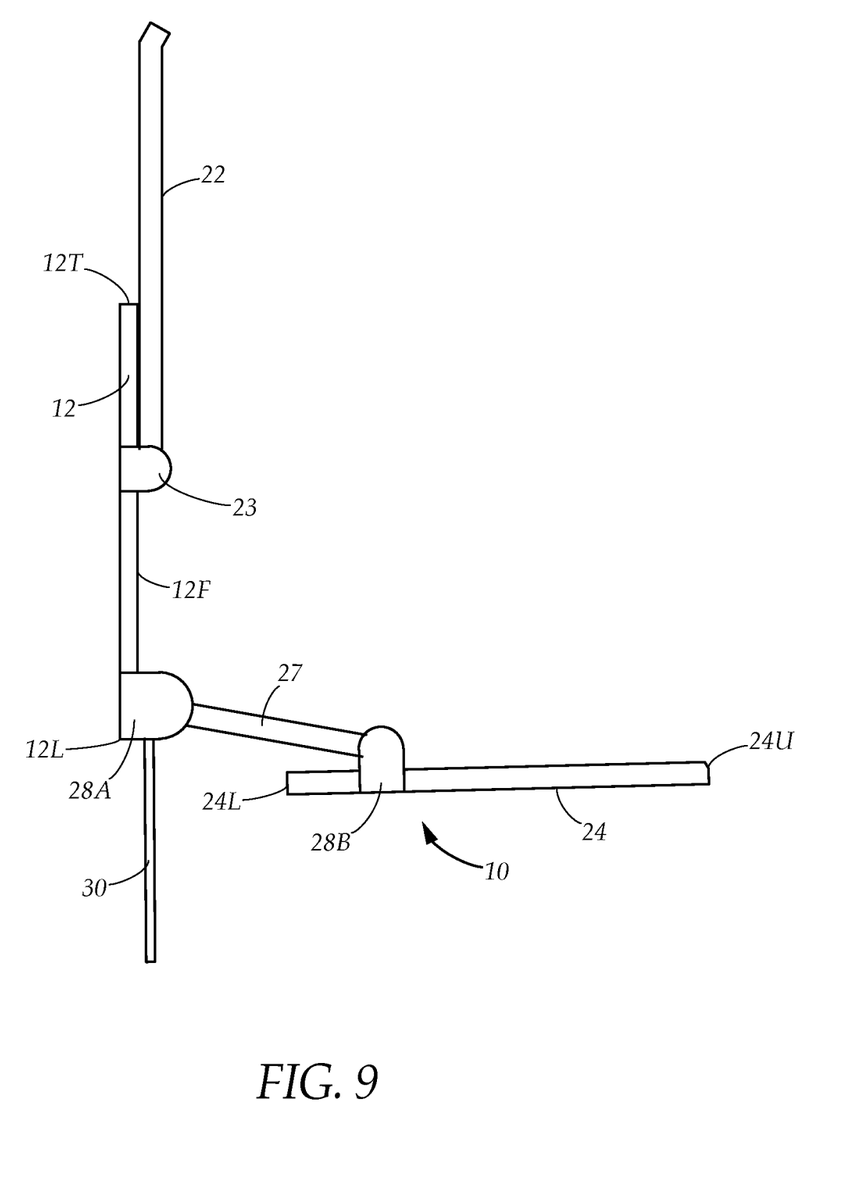
FIG. 9 is a diagrammatic side view of the modular container holder, showing the basket front being extended forwardly away from a pivot arm, in accordance with an embodiment in the present disclosure.
Figure 10:
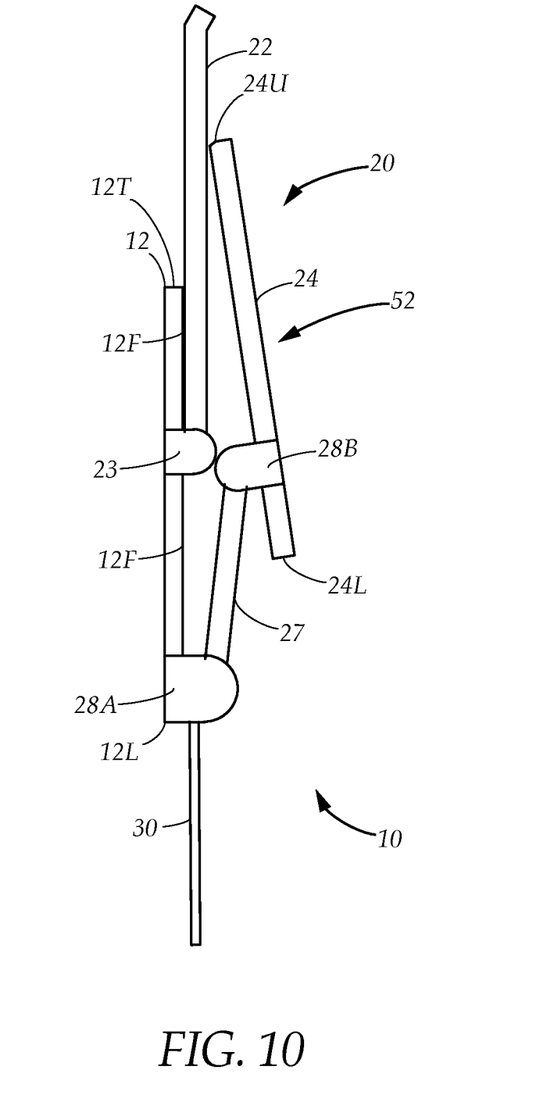
FIG. 10 is a diagrammatic side view of the modular container holder in the collapsed position, showing the basket front being pivoted upwardly along the pivot arm, in accordance with an embodiment in the present disclosure.

Referring to FIGS. 6-10, an example of the basket portion 20 entering into the collapsed state 52 from the assembled state 54 is shown. FIG. 7 shows the basket upper frame 22 being raised upwardly, detaching the upper frame front member 22F from the basket front upper portion 24U. The basket upper frame 22 pivots about the upper backing panel hinge 23 until it is parallel and in contact with the front face 12F of the backing panel 12. Next, FIG. 8 shows the basket base panel 30 being lowered, detaching the base panel front edge 30F from the basket front lower portion 24L. The basket base panel 30 pivots downwardly about the lower backing panel hinge 28A until the basket base panel 30 is approximately parallel with the front face 12F of the backing panel 12 and the base panel front edge 30F extends directly away from the lower edge 12L of the backing panel 12. Next, FIG. 9 shows the basket front 24 being pivoted forwardly about the basket front hinge 28B so that the basket front upper portion 24U extends away from the pivot arms 27. Finally, FIG. 10 shows the pivot arms 27 and the extended basket front 24 being raised upwardly until the basket front upper portion 24U points upwardly away from the top edge 12T of the backing panel 12. The basket portion 20 is now in the collapsed state 52, and the space occupied by the modular container holder 10 is minimized. Note that the steps illustrated in FIGS. 6-10 may be reversed to place the basket portion 20 into the assembled state 54.

The modular container holder 10 may be stored in the collapsed state 52 when not in use. Furthermore, the collapsed state 52 allows the modular container holder 10 to reduce packaging and space requirements, allowing multiple modular container holders 10 to be placed into a single package which would otherwise house only a single conventional container holder.

Referring to FIGS. 1-2, note that the basket portion 20 may be formed in alternate configurations in accordance with the principles of the present disclosure. The basket front 24 may be formed as a substantially solid panel, or have a wireframe configuration. In one embodiment, the basket front 24 has a left front member 25L and a right front member 25R which are arranged in parallel and extend between the basket front upper and lower portions 24U, 24L, and a front horizontal member 26 which extends horizontally therebetween. The basket front hinge 28B connects the left and right front members 25L, 25R to the left and right pivot arms 27L, 27R respectively. The container body 82 may rest upon the front horizontal member 26, and the container 80 remains visible through the basket front 24 between the left and right front members 25L, 25R. In certain embodiments, the left and right pivot arms 27L, 27R and the basket upper frame 22 may be curved, thus imparting the basket portion a "U" shape when viewed from above.

Furthermore, it is noted that the modular container holder 10 may be attached to a surface which is not vertical, so long as the basket opening 21 is properly oriented to ensure the container is retained within the basket retaining space 32.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a modular container holder with a collapsible basket portion. The disclosure is illustrated by example in the drawing figures, and throughout the written description. It should be understood that numerous variations are possible, while adhering to the inventive concept. Such variations are contemplated as being a part of the present disclosure.

What is claimed is:

1. A modular container holder adapted for holding a container, the container having a container top portion, a container lower portion, and a container body extending therebetween, the modular container holder is further adapted to be detachably secured to a vertical mounting surface, the modular container holder comprising:

a backing panel having a front face and a rear face disposed opposite thereof, the rear face having a mounting means adapted to detachably secure the backing panel to the vertical mounting surface, the backing panel further having a lower backing panel hinge;

a collapsible basket portion having a plurality of movable basket elements, the movable basket elements comprising a basket front and a basket base panel, the basket front has a front upper portion and a front lower portion, the basket front and the basket base panel are hingedly connected to the backing panel via the lower backing panel hinge, allowing the basket front and the basket base panel to pivot vertically in relation to the backing panel, the basket base panel is adapted to vertically pivot to engage the basket front lower portion to place the basket portion in an assembled state, further creating a basket retaining space which faces upwardly and is adapted to receive and retain the container, whereby the basket base panel is adapted to support the container lower portion; and the collapsible basket portion is further adapted to enter into a collapsible state, whereby the basket base panel is adapted to be pivotally lowered while the basket front is pivotally raised, causing the basket front lower portion to disengage from the basket base panel.

2. The modular container holder as described in claim 1, wherein the basket portion is tilted forwardly away from the rear face of the backing panel, and the basket front is adapted to support the container body.

3. The modular container holder as described in claim 2, wherein:

the backing panel further has a top edge, a lower edge distally oriented in relation to the top edge, and a pair of sides extending therebetween, the backing panel further having an upper backing panel hinge positioned between the top edge and the lower backing panel hinge; and the movable basket elements of the basket portion further comprise an basket upper frame, the basket upper frame having an upper left frame member and an upper right frame member which are hingedly connected to the upper backing panel hinge and project away from the backing panel, the basket upper frame further has an upper frame front member which extends horizontally between the upper left and right frame members, the basket upper frame is adapted to pivot downwardly to engage with the basket front upper portion to create a basket opening between the upper frame left member, the upper frame right member, and the upper frame front member, the basket opening is adapted to allow the container to be inserted therethrough when the basket portion is in the assembled state, the basket upper frame is further adapted to pivot upwardly to disengage from the basket front upper portion when the basket portion is placed in the collapsed state.

4. The modular container holder as described in claim 3, wherein:

the modular container holder is further adapted to be employed with a second modular container holder substantially identical to the modular container holder, the modular container holder and the second modular container holder are adapted to form a contiguous modular arrangement upon the vertical mounting surface, whereupon the modular container holder and the second modular container holder are adapted to form:

a column configuration whereby the second modular container holder is attached to the vertical mounting surface above the modular container holder and the top edge of the backing panel of the modular container holder contacts the lower edge of the backing panel of the second modular container holder, or a row configuration where one of the sides of the modular container holder contacts one of the sides of the second modular container holder.

5. The modular container holder as described in claim 4, wherein:

the basket base panel has a base panel rear edge hingedly connected to the backing panel hinge, and a base panel front edge oriented away from the backing panel, the basket base panel projects forwardly away from the backing panel and is tilted downwardly at a basket tilt angle in relation to a horizontal line drawn from the base panel rear edge when the basket portion is in the assembled state, the basket tilt angle ensures that the basket portion of the second modular container holder does not obstruct the insertion or removal of the container through the basket opening of the modular container holder positioned therebelow.

6. The modular container holder as described in claim 5, wherein:

the vertical mounting surface is comprised of a ferrous material; and the mounting means comprises a magnet.

7. The modular container holder as described in claim 6, wherein:

the rear face of the backing panel further has a friction element adapted to frictionally engage the vertical mounting surface, the friction element is adapted to prevent the modular container holder from sliding downwardly along the vertical mounting surface.

8. The modular container holder as described in claim 7, wherein:

the backing panel further has a backing panel upper portion extending between the top edge and the upper backing panel hinge, the backing panel upper portion having an upper portion height;

the basket front projects upwardly and perpendicularly away from the base panel front edge when the basket portion is in the assembled state; and the backing panel upper portion creates a vertical distance between the base panel front edge of the second modular container holder and the basket opening of the modular container holder positioned therebelow in the column configuration, whereby the basket front of the second modular container holder is substantially coplanar with an alignment plane which originates from the base panel rear edge of the modular container holder and projects upwardly and perpendicularly in relation to the basket base panel of the modular container holder, whereby the vertical distance ensures the basket portion of the second modular container holder does not obstruct the basket opening of the modular container holder.

9. The modular container holder as described in claim 8, wherein:
- the mounting means is positioned on the rear face of the top edge proximate to the backing panel upper portion; and
- the friction element is positioned between the mounting means and the lower edge of the backing panel.

10. The modular container holder as described in claim 9, wherein:
- the basket front further has a basket front hinge positioned between the basket front upper portion and the basket front lower portion, and a pair of pivot arms which project forwardly from the lower backing panel hinge to connect with the basket front hinge, the basket front hinge is adapted to allow the basket front to pivot forwardly such that the basket front upper portion extends forwardly away from the pivot arms, while the pivot arms allow the basket front to be raised upwardly towards the top edge of the backing panel when the basket portion is placed in the collapsed state.

* * * * *